United States Patent [19]

Stancel, Jr. et al.

[11] 3,761,645

[45] Sept. 25, 1973

[54] APPARATUS AND PROCESS FOR THERMOMAGNETICALLY REPLICATING MAGNETIC RECORDINGS USING A SCANNING BEAM OF RADIANT ENERGY

[75] Inventors: Albert Lee Stancel, Jr.; Warren Rex Isom, both of Indianapolis, Ind.

[73] Assignee: RCA Corporation, New York, N.Y.

[22] Filed: Mar. 31, 1972

[21] Appl. No.: 240,108

Related U.S. Application Data

[63] Continuation of Ser. No. 120,149, March 2, 1971, abandoned.

[52] U.S. Cl. 179/100.2 E, 179/100.2 CR, 346/74 MT

[51] Int. Cl. .......................... G11b 5/86, H01v 3/04

[58] Field of Search ............................ 179/100.2 E; 346/74 MT, 76 L

[56] References Cited

UNITED STATES PATENTS

| | | | |
|---|---|---|---|
| 3,652,808 | 3/1972 | Esterly et al. | 179/100.2 E |
| 3,368,209 | 2/1968 | McGlauchlin et al. | 346/74 MT |
| 3,582,570 | 6/1971 | Cushner et al | 346/74 MT |
| 3,689,934 | 9/1972 | Nacci | 346/74 MT |
| 3,699,269 | 10/1972 | Smaller | 179/100.2 E |
| 3,496,304 | 2/1970 | Nelson | 346/74 MT |

*Primary Examiner*—Harvey E. Springborn
*Attorney*—Eugene M. Whitacre et al.

[57] ABSTRACT

In a process and apparatus for replicating a prerecorded magnetic tape, the particle-binder layer of the prerecorded tape is brought into slippage-free intimate contact with the particle-binder layer of the copy tape. As the tapes are moved in a first direction a laser beam impinges upon the particle-binder layer of the copy tape with a spot size of the same order of magnitude as the particles of the particle-binder layer of the copy tape. The laser beam is deflected to traverse a scanning pattern on the particle-binder layer of the copy tape transverse to the movement of the tape to provide rapid localized heating of the copy tape magnetizable particles to a temperature above its Curie point.

20 Claims, 2 Drawing Figures

Figure 1:
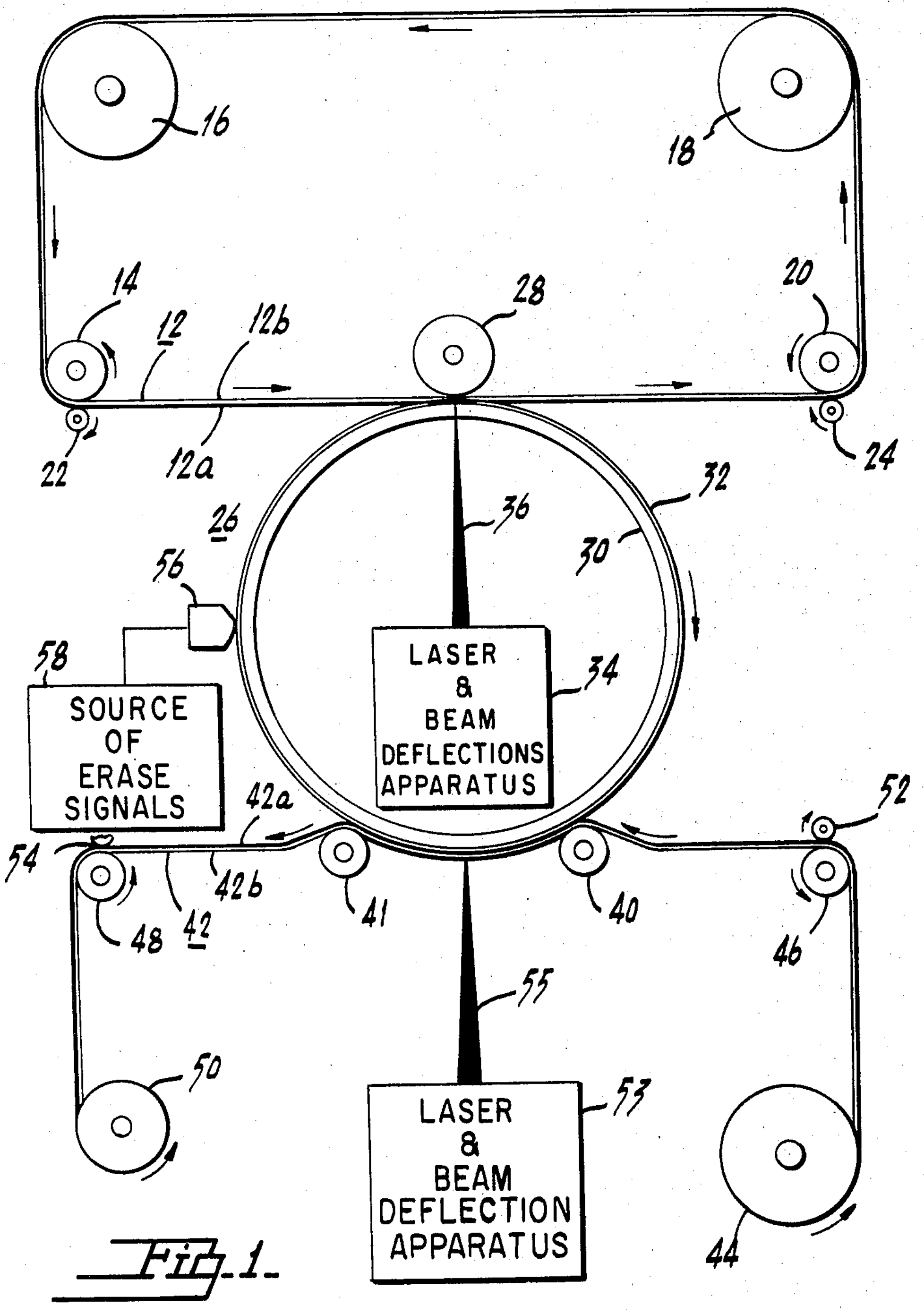

INVENTORS
ALBERT LEE STANCEL, JR
WARREN REX ISOM
BY David E. Pitchenik
ATTORNEY

INVENTOR.
ALBERT LEE STANCEL, JR
WARREN REX ISOM
BY David E. Pitchenik
ATTORNEY

APPARATUS AND PROCESS FOR THERMOMAGNETICALLY REPLICATING MAGNETIC RECORDINGS USING A SCANNING BEAM OF RADIANT ENERGY

This application is a Continuation of now abandoned application Ser. No. 120,149, filed Mar. 2, 1971, in the names of Albert Lee Stancel, Jr. and Warren Rex Isom entitled, "APPARATUS AND PROCESS FOR REPLICATING MAGNETIC RECORDINGS", and assigned to RCA Corporation.

The present invention relates to apparatus for replicating a prerecorded master magnetic tape.

In the replication of prerecorded magnetic tape, it has been the practice to bring the prerecorded master magnetic tape into intimate contact with an unrecorded or blank magnetic tape to record the image information of the master tape on the blank tape. Under typical conditions, the strength of the magnetic field associated with the prerecorded master tape is insufficient to reorient the magnetic domains of the blank magnetic tape. To effectuate a signal transfer, the prerecorded master and the blank tapes may be brought into intimate contact in the presence of an alternating magnetic bias field. The bias field vectorily adds to the magnetic field emanating from the master tape to form a magnetic field of sufficient coercive force to reorient the magnetic domains on the blank tape.

Another method proposed for replicating prerecorded magnetic tape is to heat the blank magnetic tape above its Curie point and thereafter cool it while in intimate contact with the prerecorded master magnetic tape. By heating the blank magnetic tape above its Curie point, that is, above the temperature where the magnetic particles on the tape lose their magnetization and become paramagnetic, the coercive force required to reorient the magnetic domains of the blank magnetic tape, as cooling occurs, is reduced. Thus, as the blank tape cools while in contact with the prerecorded master tape, its magnetic domains become reoriented under the coercive force of the magnetic field emanating from the recorded information on the master tape.

It has been found that replication of a prerecorded master magnetic tape using either the bias or heating techniques results in a non-linear signal duplication. Specifically, the transfer efficiency is observed to vary as a function of frequency, with the transfer efficiency falling off at higher frequencies.

In accordance with the present invention the particle-binder layers of a prerecorded magnetizable medium and an unrecorded magnetizable medium are brought into intimate contact. A source of energy heats portions of the unrecorded magnetizable medium to at least its Curie point. The heated portions have dimensions of the same order of magnitude as the largest dimensions of the particle binder layer of the unrecorded magnetizable medium. The heated portions are made to traverse a pattern on the particle binder layer of the unrecorded magnetizable medium.

Figure 2:
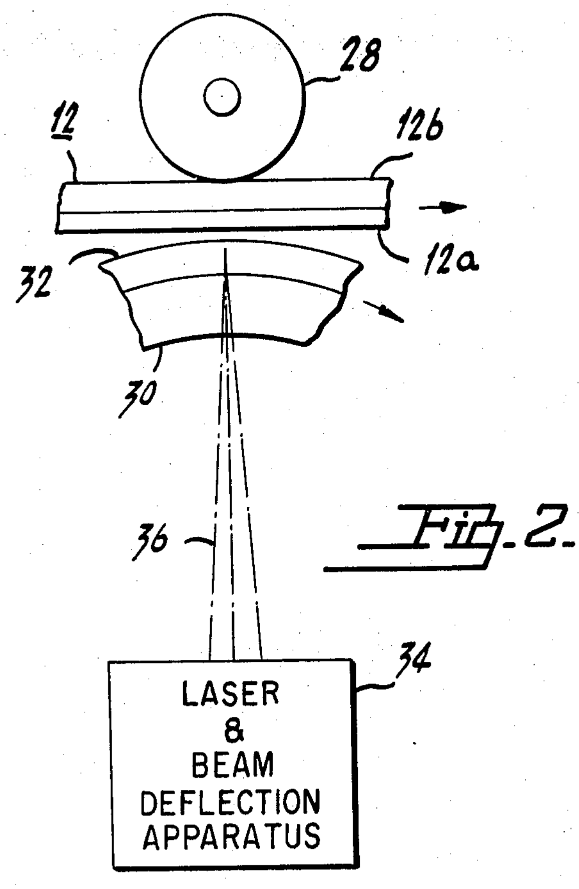

A complete understanding of the present invention may be obtained from the following detailed description of a specific embodiment thereof, when taken in conjunction with the accompanying drawings, in which:

FIG. 1 is a diagrammatic representation of an apparatus embodying the present invention and adapted to replicate a prerecorded master magnetic tape; and FIG. 2 is an enlarged partial view of the apparatus shown in FIG. 1 illustrating the focusing of the laser beam on the particle-binder layer of the intermediate transfer drum.

Referring now to FIGS. 1 and 2 where the direction of movement of many of the apparatus components is shown by arrows, an endless loop of prerecorded magnetic tape 12 is guided around four rollers 14, 16, 18 and 20. The endless loop of tape 12 is driven by means of two capstans 22 and 24 which coact with the rollers 14 and 20, respectively, to drive the tape. Where the loop of a magnetic tape 12 is extremely long, a portion of the tape may be stored in a tape storage bin, not shown, positioned along the path of travel of the tape 12. The tape 12 includes a ferromagnetic particle-binder layer **12*a* supported on a plastic substrate layer 12*b*. The ferromagnetic particle-binder layer 12*a* may be composed of oxides of iron or chromium plus a suitable plastic binder and the plastic substrate layer 12*b* may be composed of oriented polyethylene terepthylate, or other suitable strong plastic. The information recorded on the magnetic tape 12 may be audio, video, computer or instrumentation type of information. For example, the tape 12** may include video information ranging in frequency up to 6.5 MHz and recorded in a track transverse to the tape length with a track width ranging from 100 to 300 microns.

The prerecorded moving magnetic tape is positioned to travel in slippage-free contact with an intermediate transfer drum 26 by means of a pressure roller 28. The circumferential speed of the intermediate transfer drum 26 is equal to the linear speed of the prerecorded master tape 12. The intermediate transfer drum includes an inner portion or layer 30 fabricated from a material such as glass or quartz, which will pass radiant energy, and a ferromagnetic particle-binder layer 32 may be composed of oxides of iron or chromium and suitable plastic binders. The magnetizable materials of the prerecorded master magnetic tape 12 should have a higher Curie temperature than the magnetizable materials on the intermediate transfer drum 26.

A laser beam forming and deflection apparatus 34 is provided to direct a laser beam through the interior of the intermediate transfer drum 26 to the ferromagnetic particle-binder layers **12*a* and 32. The laser beam 36 is focused to converge at a point within the ferromagnetic particle-binder layer 32 of the intermediate transfer drum 26 (FIG. 2) and impinges upon the particle-binder layer 32 with a spot size of the same order of magnitude as the particles of the layer. The beam spot size is small relative to the width of the drum 26 and is deflected parallel to th axis of rotation thereof to expose all portions of the particle-binder layer. The laser beam heats the ferromagnetic particles within the small areas being scanned above their Curie point to become paramagnetic. Since the tape replication is achieved by heating techniques, signal information will be transferred only on the heated areas of intermediate transfer drum ferromagnetic particle-binder layer 32. By scanning the laser beam 36, the track width of the information recorded on the layer 32 will exceed the dimension of the impinging laser beam. Exemplary information regarding the heating of the areas is given in connection with tape 42 and laser 55.** It should be recognized, however, that the information is dependent upon the particular tape materials utilized.

The scanning of the laser beam 36 traverses a path across a portion of the intermediate transfer drum ferromagnetic particle-binder layer 32 which is in contact with the prerecorded master masgnetic tape 12. The scanned and, thus, heated area of the intermediate transfer drum ferromagnetic particle-binder layer 32 cools while in intimate contact with the ferromagnetic particle-binder layer 12*a* of the prerecorded master magnetic tape 12. As cooling occurs, the magnetic domains formed by the ferromagnetic particles of the intermediate transfer drum layer 32 are reoriented under the coercive force of the magnetic field emanating from the master magnetic tape 12.

By focusing the laser beam 36 to converge at a point within the ferromagnetic particle-binder layer 32 of the intermediate transfer drum 26, the radiant energy of the laser beam 36 is confined to an extremely small area within the ferromagnetic particle-binder layer 32 and effectuates a rapid localized heating. The heating of the particle-binder layer may be facilitated where the binder is made to be a dark colored material, such as by adding carbon black to the binder material which will aid in the absorption of the heat of the laser beam 36. By confining the heated area to only a small portion of the ferromagnetic particle-binder layer 32, the heat transfer to the prerecorded master magnetic tape ferromagnetic particle-binder layer is minimized. As a consequence, there is a wide latitude in the selection of the types of magnetizable medium employed, as to their coercivity and Curie points.

Rotation of the intermediate transfer drum 26 causes successive areas of the ferromagnetic particle-binder layer 32 to move away from contact with the respective successive areas of master magnetic tape 12, and the mirror image of the information recorded on the master magnetic tape 12 becomes recorded on the intermediate transfer drum 26 by virtue of the reorientation of the magnetic domains formed by the ferromagnetic particles within layer 32. As the intermediate transfer drum 26 continues to rotate, the recorded mirror image information moves toward two pressure rollers 40 and 41.

Pressure rollers 40 and 41 urge an unrecorded or blank magnetic tape 42 into intimate contact with the ferromagnetic particle-binder layer 32 of the intermediate transfer drum 26. The magnetic tape 43 includes a ferromagnetic particle-binder layer 42*a* and a plastic substrate layer 42*b*. The particle-binder layer 42*a* may be composed of oxides of iron or chromium, plus a suitable plastic binder and the plastic substrate layer 42*b* may be composed or oriented polyethylene terepthylate, or other suitably strong plastic. The blank magnetic tape 42 should have a lower Curie point than the ferromagnetic particle-binder layer 32 of the intermediate transfer drum 26.

The linear speed of the magnetic tape 42 is equal to the circumferential speed of the rotating intermediate transfer drum 26. Hence, the portions of the particle-binder layers 32 and 42*a* which are in contact travel in a slippage-free manner. The blank tape 42 is unwound from a supply reel 44. The tape is threaded around the pressure rollers 46 and 48 onto a driven takeup reel 50. The tape is driven by the drive capstans 52 and 54 which cooperate with the pressure rollers 46 and 48, respectively.

A second laser beam forming and beam deflection apparatus 53 provides a beam of coherent light 55 which is directed toward and focused at a point within the ferromagnetic particle-binder layer 42*a* of the blank magnetic tape 42. The laser beam 55 passes through the plastic substrate 42*b* of the tape 42. The laser beam is deflected to scan transversely across the ferromagnetic particle-binder layer 42*a*. The laser beam 55 heats the ferromagnetic particles within layer 42*a* lying along its scanning path to a temperature above their Curie point and thereby cause the ferromagnetic particles to become paramagnetic.

The heating of the ferromagnetic particles of the particle-binder layer 42*a* may be facilitated where the binder is made to be a dark colored material, such as by adding carbon black to the binder material, which will absorb the heat of the laser beam 55, while the plastic substrate is a clear, light transmissive color. By confining the heated area to only a small portion of the particle-binder layer 42*a* by focusing the laser beam 55, the heat transfer to the ferromagnetic particles of the intermediate transfer drum layer 32 is minimized. This allows a wide latitude in the selection of the type of magnetizable mediums employed as to their coercivity and Curie points.

Cooling of the ferromagnetic particle-binder layer 42*a* occurs while the layer 42*a* is in contact with the ferromagnetic particle-binder layer 32 of the intermediate transfer drum 26. The magnetic domains formed by the ferromagnetic particles of the magnetic tape 42 are reoriented under the coercive force of the magnetic field emanating from the intermediate transfer drum 26 as the particles cool. In this manner, the mirror image of the information recorded on the layer 32 is recorded on the magnetic tape 42. Consequently, the information recorded on the prerecorded master magnetic tape 12 is duplicated on the magnetic tape 42. Since the tape replication is achieved by heating techniques, signal information will be recorded only on the heated areas of ferromagnetic particle-binder layer 42*a* of the blank tape 42. By scanning the laser beam 55, the track width of the information recorded on the layer 42*a* will exceed the dimensions of the impinging laser beam. The dimensions of the heated area and the scanning path of beam 55 are selected to optimize the signal information recording.

By way of example, the ferromagnetic particles within the particle-binder layer 42*a* may be chromium dioxide ($C_rO_2$) particles 2 microns long and 0.3 microns wide having a Curie point of 130° C. The particle-binder layer 42*a* may be 5 microns thick and composed, by weight, of 70% chromium dioxide, 28% polyurethane binder and 2% carbon black. A chart of laser beam power (power of the beam as it is emitted at the laser) for different longitudinal speeds of tape 42 is given below. It is assumed that the laser 55 is focused at a point within the particle-binder layer 42*a* such that it has a 5 micron spot size at the 70 percent power points and that the particle-binder layer 42*a* is at a room temperature of 25° C and is to be heated to its Curie point of 130° C. The laser beam 55 is deflected to scan a path 5 microns wide as it enters the particle-binder layer 42*a* with a 2 micron gap between scans. The chart sets forth representative laser beam power for different longitudinal tape speed. The chart includes laser power and tape speed information for ½ inch wide tape and 1 inch wide tape.

½" WIDE TAPE

| Tape Speed in Inches Per Second | Beam Scanning Speed in Inches Per Second | Laser Power in Watts to Heat Particles to Curie Point |
|---|---|---|
| 1 | $1.815 \times 10^3$ | .38 |
| 10 | $1.815 \times 10^4$ | 3.8 |
| 100 | $1.815 \times 10^5$ | 38 |
| 200 | $3.63 \times 10^5$ | 76 |

1" WIDE TAPE

| Tape Speed in Inches Per Second | Beam Scanning Speed in Inches Per Second | Laser Power in Watts to Heat Particles to Curie Point |
|---|---|---|
| 1 | $3.63 \times 10^3$ | .76 |
| 10 | $3.63 \times 10^4$ | 7.6 |
| 100 | $3.63 \times 10^5$ | 76 |
| 200 | $7.26 \times 10^5$ | 152 |

It should be noted that the laser power may vary by a factor up to 5 from the wattage ratings given. However, such variations are well within the power capabilities of currently available lasers such as a carbon dioxide ($CO_2$) laser.

As succeeding areas of the ferromagnetic particle-binder layer 32 of the intermediate transfer drum 26 move out of contact with the magnetic tape 42, they are passed across the tap of an erasure head 56 which is energized from a source of erasure signals 58. The magnetic field associated with the erase head 56 obliterates the information recorded on the intermediate transfer drum 26 and reorients the magnetic domains to a random position. It should be recognized that the information recorded on the intermediate transfer drum 26 can be erased by heating the particles of the ferromagnetic particle-binder layer 32 to a temperature above their Curie point and thereafter permitting the particles to cool in the absence of a magnetic field.

By confining the area heated on the unrecorded or blank magnetizable medium, the transfer efficiency for higher frequencie signals is improved. This is understood to be due to a self-erasure effect when large areas of a blank magnetic tape are heated. High frequency signals have a shorter wavelength and, hence, are formed by fewer magnetic particles (domains) than lower frequency signals. Thus, any coercive effect on a particular particle or group of particles forming part of a high frequency signal due to the magnetic field of an adjacent magnetic particle or group of particles, has a greater percentage effect than on a larger group of particles, their domains forming part of a lower frequency signal. By confining the heated area of the blank medium to a small size, the self-erasure effect is reduced because only incremental particle heating occurs, as the laser beam transversely scans across a moving magnetizable medium.

What is claimed is:

1. An apparatus comprising:

a prerecorded magnetizable medium and an unrecorded magnetizable medium each having a particle-binder layer;

means for positioning at least a portion of the particle-binder layer of said prerecorded magnetizable medium in intimate contact with the particle-binder layer of said unrecorded magnetizable medium;

means for generating a beam of energy directed to impinge upon the particle-binder layer of said unrecorded magnetizable medium to heat the particles of said medium to its Curie point, said beam impinging upon the particle-binder layer with a spot size of the same order of magnitude as the largest dimension of the particles of the particle-binder layer of said unrecorded magnetizable medium; and means for deflecting said beam of energy to traverse a scanning pattern on the particle-binder layer of said unrecorded magnetizable medium.

2. An apparatus as defined in claim 1 wherein said beam of energy is a beam of coherent radiant energy.

3. An apparatus as defined in claim 2 wherein said positioning means positions said prerecorded and said unrecorded magnetizable mediums in slippage free contact and moves said mediums in a direction transverse to the scanning pattern of said beam of coherent radiant energy.

4. An apparatus as defined in claim 3 wherein said beam of coherent radiant energy is focused to a point located within the particle-binder layer of said unrecorded magnetizable medium.

5. An apparatus as defined in claim 2 wherein the particle-binder layer of said unrecorded magnetizable medium is supported on a clear radiant energy transmissive material.

6. An apparatus as defined in claim 5 wherein the particle-binder layer of said unrecorded magnetizable medium is dark in color to facilitate heat absorption within the particle-binder layer of the radiant energy of said beam.

7. An apparatus comprising:

a prerecorded magnetizable medium and an unrecorded magnetizable medium each having a particle-binder layer;

means for positioning at least a portion of the particle-binder layer of said prerecorded magnetizable medium in slippage free intimate contact with the particle-binder layer of said unrecorded magnetizable medium and moving said prerecorded and unrecorded magnetizable mediums in a first direction;

a laser for generating a beam of coherent radiant energy which is directed to impinge upon the particle-binder layer of said unrecorded magnetizable medium with an impinging spot size of the same order of magnitude as the largest dimension of the particles of the particle-binder layer of said unrecorded magnetizable medium to heat the particles of said medium to its Curie point; and means for deflecting said beam of coherent radiant energy to traverse a scanning pattern on the particle-binder layer of said unrecorded magnetizable medium.

8. An apparatus as defined in claim 7 wherein said first direction of movement of said prerecorded and said unrecorded magnetizable mediums is transverse to the scanning pattern of said beam of coherent radiant energy.

9. An apparatus as defined in claim 8 wherein said prerecorded magnetizable medium is a magnetic tape having video information recorded thereon and said unrecorded magnetizable medium is a magnetic tape.

10. An apparatus as defined in claim 9 wherein the particles of the particle-binder layer of said unrecorded magnetic tape are formed from chromium dioxide.

11. A process for replicating a prerecorded magnetizable medium, comprising the steps of:

positioning at least a portion of the particle-binder layer of said prerecorded magnetizable medium in intimate contact with the particle-binder layer of an unrecorded magnetizable medium;

generating a beam of energy and directing the beam to impinge upon the particle-binder layer of said unrecorded magnetizable medium with an impinging spot size of the same order of magnitude as the largest dimensions of the particles of the particle-binder layer of said unrecorded magnetizable medium to heat the particles of said medium to its Curie point; and deflecting said beam of energy to traverse a scanning pattern on the particle-binder layer of said unrecorded magnetizable medium.

12. A process for replicating a prerecorded magnetizable medium as defined in claim 11 wherein said beam of energy is a beam of coherent radiant energy.

13. A process for replicating a prerecorded magnetizable medium as defined in claim 12 wherein said prerecorded and unrecorded magnetizable mediums are positioned in slippage free contact and including the step of moving said medium in a direction transverse to the scanning portion of said beam of coherent radiant energy.

14. A process for replicating a prerecorded magnetizable medium as defined in claim 13 wherein said beam of coherent radiant energy is a laser beam.

15. A process for replicating a prerecorded magnetizable medium as defined in claim 14 wherein said prerecorded magnetizable medium is a magnetic tape having video information recorded thereon and said unrecorded magnetizable medium is a magnetic tape.

16. A process for replicating a prerecorded magnetizable medium as defined in claim 15 wherein the particles of the particle-binder layer of said unrecorded magnetic tape are formed from chromium dioxide.

17. A process for replicating a prerecorded magnetizable medium, comprising the steps of:

positioning at least a portion of the particle-binder layer of said prerecorded magnetizable medium in intimate contact with the particle-binder layer of an unrecorded magnetizable medium;

heating portions of the unrecorded magnetizable medium to heat the particles of said unrecorded magnetizable medium to at least its Curie point, the heated portions having dimensions of the same order of the magnitude as the largest dimensions of the particles of the particle-binder layer of said unrecorded magnetizable medium; and causing said heated portions to traverse a pattern on the particle-binder layer of said unrecorded magnetizable medium.

18. An apparatus comprising:

a prerecorded magnetizable medium and an unrecorded magnetizable medium each having a particle-binder layer;

means for positioning at least a portion of the particle-binder layer of said prerecorded magnetizable medium in intimate contact with the particle-binder layer of said unrecorded magnetizable medium;

a source of energy for heating portions of the particle-binder layer of said unrecorded magnetizable medium to heat the particles of said portion to at least its Curie point, said heated portions having dimensions of the same order of magnitude as the largest dimensions of the particles of the particle-binder layer of said unrecorded magnetizable medium; and means for causing said heated portions to traverse a pattern on the particle-binder layer of the unrecorded magnetizable medium.

19. A process for replicating a prerecorded magnetizable medium as defined in claim 17 wherein said pattern is such that all the particles of the particle-binder layer of said unrecorded magnetizable medium are heated to at least their Curie point.

20. An apparatus as defined in claim 19 wherein said pattern is such that all the particles of the particle-binder layer of said unrecorded magnetizable medium are heated to at least their Curie point.

* * * * *